2,955,344
Patented Oct. 11, 1960

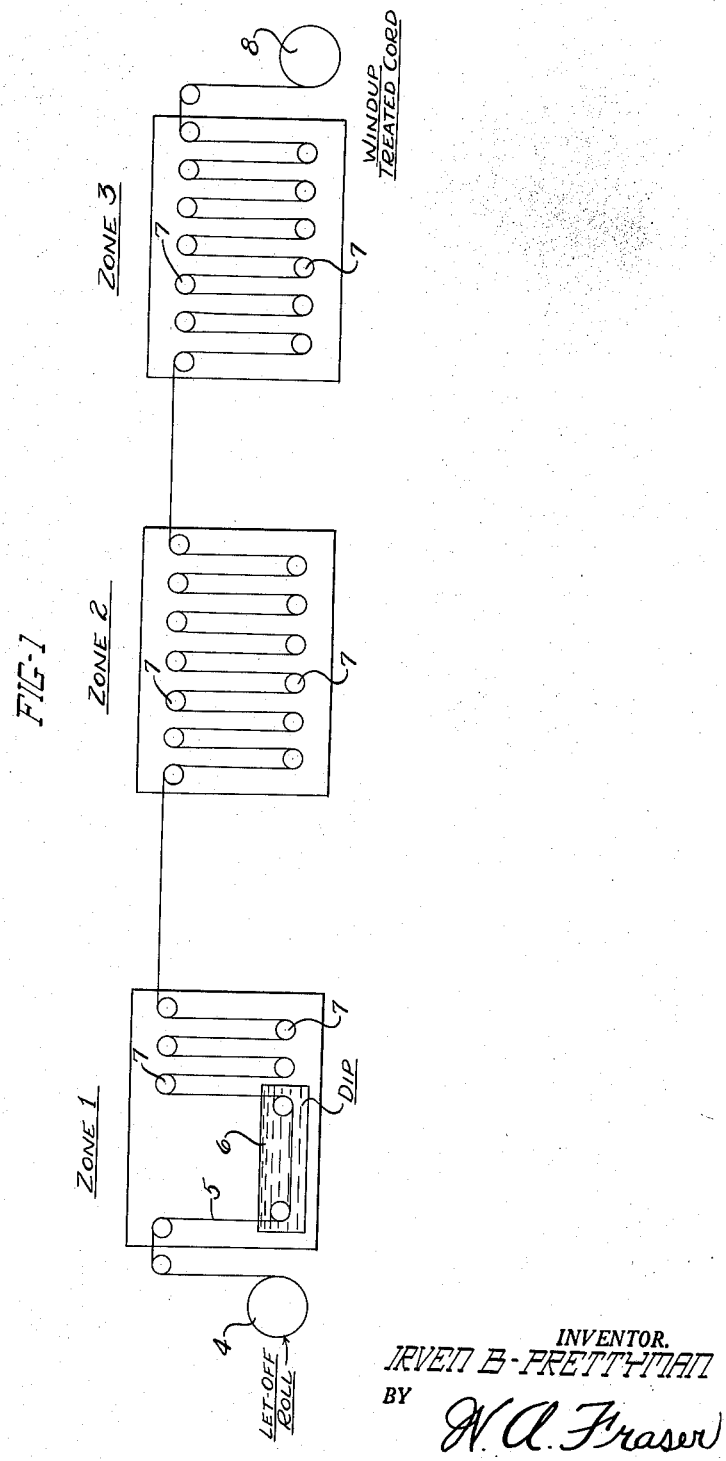

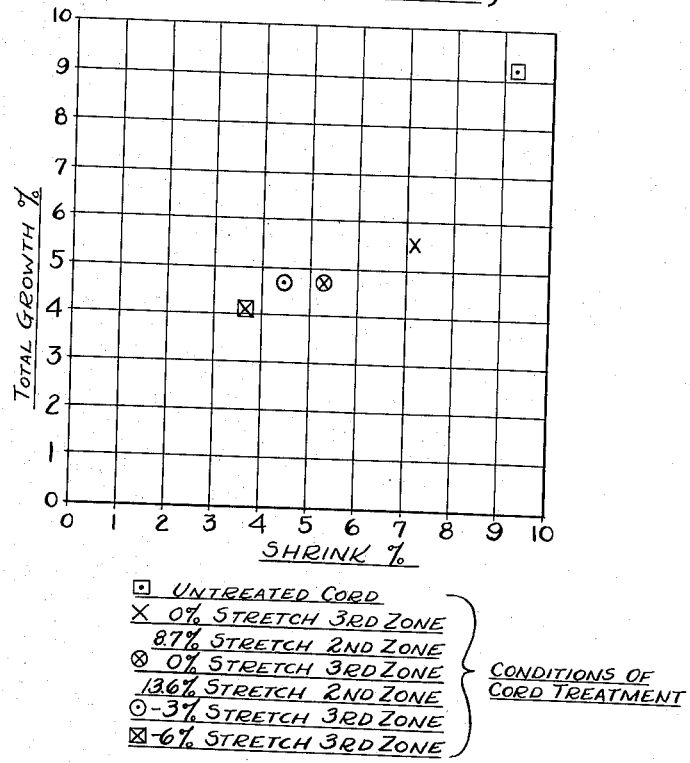

2,955,344
TEXTILE ELEMENT TREATMENT

Irven B. Prettyman, Akron, Ohio, assignor to The Firestone Tire & Rubber Company, Akron, Ohio, a corporation of Ohio Filed Aug. 8, 1955, Ser. No. 527,020

5 Claims. (Cl. 28—72)

This invention relates to the treatment of synthetic textile elements and the like and more particularly to means for processing heat-shrinkable fibers, filaments, cords and fabric sheet continuously and on a commercial scale.

Heat-shrinkable textile elements such as polyamide fibers, filaments, cords and fabrics contain a high degree of dimensional instability as evidenced by shrink and growth characteristics, which are manifest when such continuous textile elements are continuously processed by equipment in train under varying conditions of moisture, heat and tension and then are laminated by means of heat and pressure into composite articles such as vulcanized tires. Readjustment of the polyamide element by growth or shrinkage in such a composite article during and after heat processing results in inferior articles and poor performance of such articles when put to the intended use. Attempts to overcome and eliminate these undesirable characteristics have not been entirely successful.

The present invention reduces simultaneously the shrink and growth characteristics of continuous heat-shrinkable textile elements by subjecting such elements to novel conditions of tension, high temperature, controlled stretch and controlled relaxation at high temperatures in three treatment zones in train.

It is therefore an object of the invention to provide means for continuously processing heat-shrinkable textile elements; for processing such elements through three zones of treatment at high temperatures; for subjecting such elements to three successive zones of treatment wherein high temperature and stretch or tension are applied to the elements in the first two zones. Yet, a further object of the invention is to pass continuous polyamide textile elements through three zones of treatment wherein the elements are stretched in the first two zones and relaxed a controlled amount under high temperature in the third zone, all zones being maintained at predetermined temperatures.

The invention will be described in the form of processing nylon cord for use in composite vulcanized rubber articles such as tires and will be more fully understood by reference to the specification, claims and drawings of which:

Figure 1 is a diagrammatic representation of a typical method of practicing the invention;

Figure 2 is a chart showing the properties of shrink and growth in percent found in polyamide textile elements processed in the novel manner.

Referring to Figure 1, letoff roll 4 feeds nylon cord 5 continuously through processing zones 1, 2 and 3, having predetermined conditions of tension, relaxation and temperature to windup roll 8.

Zone 1 is provided with tank 6 containing rubber-polyamide adhesion-promoting dips in which cord 5 is immersed. The temperature in zone 1 may be adjusted to dry the cord after it is dipped or drying may take place in zone 2.

All three zones are provided with conventional drive rolls 7 or other drive means which are driven at predetermined speeds to apply predetermined tension accurately to either stretch or relax the passing cord 5. Each zone is also provided with a conventional source of heat not shown for applying a predetermined temperature to the cord, the zones being insulated one from the other for accurate temperature control.

TESTS

To evaluate the nylon cord treated by the invention, two tests were run: (1) "Total Growth Percent" and (2) "Percent Shrink."

"Total Growth Percent" was arrived at by placing a length of cord vertically in a cold oven and securing both ends. The oven was heated in 30 minutes to 284° F. and a 3 pound load applied to the lower end of the cord. After a 12 second interval, the length of the cord was measured and the increase in length calculated in percent of original length. After a 1,300 minute interval, a second measurement of length was made and the increase in length again calculated in percent of original length. The sum of the two measurements in percent was reported as "Total Growth Percent."

"Percent Shrink" was determined by laying an unrestrained length of nylon cord in an oven at 320° F. for 30 minutes, measuring the length of the cord and reporting the percent decrease in length as "Percent Shrink."

In the preferred modification of the invention, the nylon cord is passed through zone 3 under tension conditions allowing the cord to relax or shrink at a temperature not exceeding 430° F.

Example I

To test the form of the invention wherein the cord was relaxed in zone 3, a cord of 840/2 nylon was passed through the three zone system under the following conditions:

|  | Zone 1 | Zone 2 | Zone 3 |
|---|---|---|---|
| Temperature _____°F__ | 300 | 400 | 425 |
| Stretch Applied to Cord During Passage Through Zone_____percent__ | .2 | 8.7 | 0 |
| Time in Zone_____Sec__ | 30 | 20 | 20 |

The resulting properties of the treated cord were better than the untreated cord as indicated below:

|  | Cord of Example 1 | Untreated Cord Control |
|---|---|---|
| Total Growth, Percent_____ | 5.46 | 9.42 |
| Shrink in Percent_____ | 5.80 | 8.70 |

Example II

A single cord of 840/2 nylon was run under the identical conditions of Example I except that the stretch applied to the cord in the second zone was 13.6%. The growth and shrink characteristics of the treated cord surpassed those of the untreated control and the treated cord of Example I as follows:

|  | Cord of Example II | Untreated Cord Control |
|---|---|---|
| Total Growth Percent_____ | 4.77 | 9.42 |
| Shrink in Percent_____ | 4.8 | 8.70 |

Example III

Relaxation of the cord in the third zone greater than 0% stretch and as high as —6% stretch gives even greater improved nylon cord. To demonstrate this advantage, two runs were made. In the first run, a cord was relaxed 3% in the third zone and in the second run, a cord was relaxed 6% in the third zone. The second zone stretch was applied to give approximately the same overall stretch for both runs. Six percent relaxation is, of course, the same as —6% stretch. Conditions were:

|  | Zone 1 | Zone 2 | Zone 3 |
|---|---|---|---|
| Temperature_____°F__ | 300 | 400 | 425 |
| Stretch 1st run_____percent__ | 2 | 13.6 | [1]—3 |
| Stretch 2nd run_____do____ | 2 | 17.1 | [2]—6 |
| Time Both Runs_____Sec__ | 30 | 20 | 20 |

[1] Or 3 percent relaxation.
[2] Or 6 percent relaxation.

The following results were obtained:

|  | Cord 1st Run (3% Relaxation) | Cord 2nd Run (6% Relaxation) | Untreated Control |
|---|---|---|---|
| Total Growth, Percent_____ | 4.95 | 4.91 | 9.42 |
| Shrink, Percent_____ | 4.2 | 3.6 | 8.70 |

This first run cord treated with a 3% relaxation in the third zone is better for shrink and growth over the prior art untreated cord while the cord treated in the third zone with 6% relaxation was better in growth and in shrink characteristics than either of the other cords. It has been found that relaxation as high as 10% in the third zone is beneficial in treating nylon cord in the present invention. In view of the invention, either tension or stretch may be controlled. If tension is controlled, the stretch will vary with variations in thickness and modulus of the cord. On the other hand, if stretch is controlled instead of tension, uniform stretch may be maintained on the cord throughout the run. In some instances, it is desirable to control tension in the first zone and stretch in the following two zones.

Heat setting nylon cord or fabric at high relaxation after heat treatment at high tension and stretch reduces shrink without a corresponding growth increase. Under conditions of third zone relaxation of up to 10%, it has been found that a maximum of second zone stretch of over 21% gives no beneficial results. Likewise, it has been found that temperature treatment above 440° F. for more than 20 seconds in any of the zones seriously lowers the strength of the treated cord. The temperature in the second zone of treatment may range from 350 to 430° F. but preferably is about 400° F. Temperatures in the third zone are preferably higher than second zone temperatures ranging from 400° F. to 440° F. with approximately 430° F. preferred.

The function of the first zone treatment in one modification of the invention is to dip and dry the cord in preparation for hot stretching and hot relaxation in zones 2 and 3 respectively. Zone 1 may be heated to whatever temperature is necessary to dry the cord before it enters zone 2. This temperature may be from room temperature to 430° F. depending upon the rate of travel of the nylon cord through zone 1. In the preferred form of the invention, the cord travels through zone 1 in 30 seconds and it has been found that a temperature of 300° F. completely dries the cord in that length of time before it leaves zone 1. In this modification of the invention, the amount of stretch applied to the cord in zone 1 is important for the reason that some stretch or tension must be placed on the cord in this zone to prevent it from drooping or bagging. Two percent stretch has been found satisfactory in this zone although higher or lower stretch may be used as long as the fabric does not bag or droop.

In another modification of the invention, the cord is not completely dried in the first zone but passes to the second zone in a semi-wet state. In this modification of the invention, a wet stretching at from 350 to 430° F takes place in the first part of the second zone and a controlled relaxation at a temperature of from 400 to 440° F. takes place on the dried cord in the third zone.

In its broadest form the invention may be considered as a combination of hot stretching of heat-shrinkable textile elements combined with a controlled relaxation at high temperature, said relaxation being less than the amount of stretch put into the element in the first two zones.

Referring to the chart, Figure 2 "Total Growth Percent" has been plotted as the ordinate and "Shrink Percent" has been plotted as the abscissa. For purposes of factory processing as well as for service of the finished composite article containing nylon cord, the most desirable condition would be a cord which had zero growth and zero shrink at all conditions of processing heat and tension. Referring to Figure 2, it is seen that the untreated cord has a very high factor of both shrinkage and growth. Under the conditions of processing as set out in the examples in view of the invention, the relaxation of the cord in the third zone after high tension and high temperature treatment in the first and second zones gives the cord much better growth and shrink properties, the best result being one treated at at least 6% relaxation in the third zone.

While the preferred example has been described as the treatment of a nylon cord, the invention relates as well to the treatment of nylon fabric and nylon sheet and other heat-shrinkable sheets and fibers of the nylon type such as those composed of polycaprolactam and polyethylene terephthalate. In particular, weftless nylon fabric having cords of, for example, 840/2, 210/4/2 held together by pick threads may be processed to advantage by means of the invention.

When heat-shrinkable textile elements comprised of polycaprolactam and the like such as nylon 6 are processed in view of the invention, a second zone temperature of 320 to 400° F. is desirable. The third zone temperature should not exceed 410° F. with this material.

The use of polyethylene terephthalate textiles such as Dacron [1] in the invention requires a slightly higher temperature with a second zone range of from 350° F. to 450° F. and a third zone temperature of not exceeding 450° F.

It will be noted that the various processing temperatures can be expressed as percentages of the Fahrenheit melting points of the materials being treated. The melting points of nylon 66, polycaprolactam (nylon 6) and polyethylene terephthalate are 482° F., 420° F. and 480° F., respectively (Textile World, Synthetic Fiber Table, Revision 1955). Thus, for example, the nylon-stretching temperature range of 350° F. to 430° F. can be expressed as being substantially from 70 to 90% of the Fahrenheit melting point of nylon 66.

Conventional machinery is available for applying tension to sheets of fabric as wide as or wider than 61 inches in width having as many cords as 1,926 to the sheet. Such fabric is available on the market and is generally used in the construction of pneumatic tires.

The stretch of the cord in any zone may be defined as the increase in length of the cord in percent during the passage of the cord through the zone in question. Relaxation of the cord in any zone may be defined as the decrease in length of the cord in percent during the passage through the zone in question. The length of the cord entering any zone of treatment may be defined as its attained length.

Although only the preferred form has been described, it will be obvious to those skilled in the art that modifications may be made within the scope of the invention in view of the specification and following claims.

---

[1] Sold by the E. I. du Pont de Nemours Company, Wilmington, Delaware.

I claim:

1. A method of treating a previously dipped and dried continuous textile element comprised of polycaprolactam comprising the steps of subjecting said element to a temperature of from 320 to 400° F. while stretching said element not over 21% of its original length, and thereupon subjecting said element to a temperature of from 380° F. to 400° F. while relaxing said element less than the amount of said stretching.

2. A method of treating a previously dipped and dried continuous textile element comprised of polyethylene terephthalate comprising the steps of subjecting said element to a temperature of 350° F. to 450° F. while stretching said element to not exceeding 21% of its original length and thereupon subjecting said element to a temperature of 400° F. to 450° F. while relaxing said element less than the amount of said stretching.

3. A method of treating a continuous element of heat shrinkable material selected from the group consisting of polyesters and polyamides comprising the steps of heating said element to a temperature of from 350° F. to the melting point of the material while stretching said element not over 21% of its original length and thereupon subjecting said element to from zero stretch to a controlled relaxation of less than the amount of said stretching while heating said element to a temperature of from 320° F. not over the melting point of the material whereby to reduce the growth and shrink characteristics of the finished element.

4. A method of treating a continuous element of previously dipped and dried heat-shrinkable textile material according to claim 3 wherein the element is subjected to a relaxation not exceeding 6% as said element passes through said second heating step.

5. A method of treating a continuous element of heat-shrinkable material selected from the group consisting of polyamides and polyesters comprising the steps of dipping said element in a rubber-cord adhesion promoting dip then drying said element at a temperature not exceeding 430° F. while stretching it at least 2%, heating said element to a temperature of from 350° F. to not over the melting point of the material while stretching said element not over 21% of its original length and thereupon subjecting said element to from zero stretch to a controlled relaxation of less than the amount of said stretching while heating said element to a temperature of from 320° F. to not over the melting point of the material whereby to reduce the growth and shrink characteristics of the finished element.

References Cited in the file of this patent

UNITED STATES PATENTS

| | | |
|---|---|---|
| 2,509,741 | Miles | May 30, 1950 |
| 2,584,779 | Averns et al. | Feb. 5, 1952 |
| 2,628,405 | Wentz | Feb. 17, 1953 |